United States Patent
Kennard et al.

(10) Patent No.: US 7,971,929 B2
(45) Date of Patent: Jul. 5, 2011

(54) MEAL TRAY WITH ADVERTISING DISPLAY

(75) Inventors: Stephen Kennard, Bedfordshire (GB); Gary Osborne, Bedfordshire (GB)

(73) Assignee: BE Aerospace, Inc., Wellington, FL (US)

( * ) Notice: Subject to any disclaimer, the term of this patent is extended or adjusted under 35 U.S.C. 154(b) by 0 days.

(21) Appl. No.: 12/607,352

(22) Filed: Oct. 28, 2009

(65) Prior Publication Data

US 2011/0095577 A1    Apr. 28, 2011

(51) Int. Cl.
*A47B 83/02* (2006.01)
*A47C 7/62* (2006.01)

(52) U.S. Cl. .................. 297/146; 297/163; 297/188.04

(58) Field of Classification Search .................. 297/146, 297/163, 170, 173, 188.04; 108/50.11; 40/320
See application file for complete search history.

(56) References Cited

U.S. PATENT DOCUMENTS

| | | |
|---|---|---|
| 741,004 A | 10/1903 | Van Nostran |
| 769,868 A | 9/1904 | May |
| 2,384,274 A | 9/1945 | Bean |
| 4,521,021 A | 6/1985 | Dixon |
| 4,643,381 A | 2/1987 | Levy |
| 5,004,252 A | 4/1991 | Kraper |
| 5,010,668 A | 4/1991 | Zeligson |
| 5,259,136 A | 11/1993 | Goserud |
| 5,309,659 A | 5/1994 | Eastman |
| 5,471,922 A | 12/1995 | Hall |
| 5,720,515 A * | 2/1998 | Haffner .................... 297/188.04 |
| 5,738,217 A | 4/1998 | Hunter |
| 5,749,305 A | 5/1998 | Jacovelli |
| 5,876,092 A | 3/1999 | An |
| 5,927,502 A | 7/1999 | Hunter |
| 5,954,394 A | 9/1999 | Czyewski |
| 6,068,127 A | 5/2000 | Hunter |
| 6,116,167 A | 9/2000 | Rabe |
| 6,240,667 B1 * | 6/2001 | Harney et al. .................. 40/649 |
| 6,279,992 B1 | 8/2001 | Plocher et al. |

(Continued)

FOREIGN PATENT DOCUMENTS

DE        2013534 A1    10/1971

(Continued)

OTHER PUBLICATIONS

Dec. 27, 2010 International Search Report issued in Application No. PCT/US2010/054474.

(Continued)

*Primary Examiner* — Milton Nelson, Jr.
(74) *Attorney, Agent, or Firm* — Oliff & Berridge, PLC

(57) ABSTRACT

A meal tray assembly for being carried by an aft-facing side of a seat back for use by a person seated aft of the seat back is provided. The assembly includes a tray mountable to the seat back and including a first shell having a forward facing surface when in the stowed position and a second shell for mating with the first shell and having a rearward facing surface towards the aft-seated person when in the stowed position. A major recess is defined in the rearward facing surface of the second shell and an inwardly facing elongate flanged is carried by the rearward facing surface of the second shell and extending towards the major recess. A flexible screen is provided for being positioned in the recess by an interference fit between the inwardly facing flange and an engaging surface of the major recess.

18 Claims, 10 Drawing Sheets

U.S. PATENT DOCUMENTS

| | | |
|---|---|---|
| 6,282,824 B1 | 9/2001 | Noll et al. |
| 6,401,927 B1 | 6/2002 | Sorensen et al. |
| 6,425,649 B2 | 7/2002 | Kasuya |
| 6,550,861 B1 | 4/2003 | Williamson |
| 6,592,179 B1 * | 7/2003 | Miyazaki ................... 297/146 |
| 6,739,654 B1 | 5/2004 | Shen et al. |
| 6,869,120 B2 | 3/2005 | Johnson, Jr. et al. |
| 7,104,599 B2 * | 9/2006 | Berger et al. ................ 297/163 |
| 7,621,593 B2 * | 11/2009 | Dickinson ................... 297/163 |
| 2002/0043826 A1 | 4/2002 | Ingram et al. |
| 2002/0047294 A1 | 4/2002 | Ellinidis et al. |
| 2002/0066393 A1 | 6/2002 | Strode et al. |
| 2003/0019136 A1 | 1/2003 | Whitman |
| 2003/0217673 A1 | 11/2003 | Berger et al. |
| 2004/0094998 A1 | 5/2004 | Williamson et al. |
| 2005/0126445 A1 | 6/2005 | Guard et al. |
| 2005/0178297 A1 | 8/2005 | Pipkin |
| 2005/0204596 A1 | 9/2005 | Peng |
| 2007/0216202 A1 | 9/2007 | Dickinson |

FOREIGN PATENT DOCUMENTS

| | | |
|---|---|---|
| DE | 4340189 A1 | 6/1995 |
| DE | 2027355 U1 | 8/2002 |
| EP | 1260433 A2 | 11/2002 |
| EP | 1361108 A2 | 4/2003 |
| WO | 99/04381 AI | 1/1999 |
| WO | 9932016 A1 | 7/1999 |
| WO | 0002745 A1 | 1/2000 |
| WO | 2006119784 A1 | 11/2006 |

OTHER PUBLICATIONS

Dec. 27, 2010 Written Opinion issued Application No. PCT/US2010/054474.

* cited by examiner

MEAL TRAY WITH ADVERTISING DISPLAY

BACKGROUND OF THE INVENTION

This invention relates generally to vehicle passenger seating and more particularly to a meal tray for a passenger seat unit.

Commercial passenger aircraft seats often include seatback-mounted meal trays for use in consuming meals, holding work items, and the like. These trays typically fold between an upright, stowed position against the seat back of a seat forward of the user, and a lowered, deployed use position. It is known to adapt passenger seat meal trays to carry graphic displays with passenger information or advertisements.

These displays are subject to theft or vandalism and must be protected. However, the time available for changing the displays between flights is short, and therefore it is undesirable to employ a mounting structure which is too complex. There is therefore a need for a display mounting device and system and is adapted particularly to the public transportation environment, for example, aviation, rail and bus transportation.

Accordingly, there is an object of the invention to provide for a meal tray with a secure yet easily-changed structure for displaying advertising or similar graphical materials.

This and other objects and advantages of the invention are achieved by providing a meal tray assembly for being carried by an aft-facing side of a seat back for use by a person seated aft of the seat back. The meal tray assembly includes a tray mountable to the seat back and movable between a stowed position generally flush with the seat back and a deployed position generally perpendicular to the seat back. The tray includes a first shell having a forward facing surface when in the stowed position and a second shell for mating with the first shell and having a rearward facing surface towards the aft-seated person when in the stowed position. A major recess is defined in the rearward facing surface of the second shell. An inwardly facing elongate flanged is carried by the rearward facing surface of the second shell and extending towards the major recess. A flexible screen is provided for being positioned in the recess by an interference fit between the inwardly facing flange and an engaging surface of the major recess.

According to another embodiment, the major recess further defines a minor recess about a periphery of the major recess for providing clearance to corners of the screen.

According to another embodiment, the screen is generally flush with the engagement surface when positioned in the major recess.

According to another embodiment, the assembly further includes an insert positioned between the first shell and the second shell at about the inwardly facing flange for increasing the strength of the inwardly facing flange.

According to another embodiment, the screen has graphics provided thereon.

According to another embodiment, the assembly further includes a graphical display sheet for being positioned between the screen and the second shell.

According to another embodiment, the thickness of the screen is equal to about the distance between a fore facing side of the inwardly facing flange when the tray is in the stowed position and the engaging surface of the recess.

According to another embodiment, the inwardly facing flange comprises a first pair of spaced-apart, opposing flanges carried on laterally extending sides of the rearward facing surface of the second shell.

According to another embodiment, the width of the screen is greater than the distance between respective inwardly facing surfaces of the first pair of spaced-apart opposing flanges.

According to another embodiment, the inwardly facing flange comprises a second pair of spaced-apart, opposing flanges carried on longitudinally extending sides of the rearward facing surface of the second shell.

According to another embodiment, the height of the screen is greater than the distance between respective inwardly facing surfaces of the second pair of spaced-apart, opposing flanges.

According to another embodiment, the first shell defines a recess that corresponds in shape with the major recess of the second shell to provide mutual engagement of the first and second shells.

According to another embodiment, the first shell defines a meal tray recess on the fore facing side.

According to another preferred embodiment, a meal tray assembly is provided for being carried by an aft-facing side of a seat back for use by a person seated aft of the seat back. The assembly includes a tray mountable to the seat back and movable between a stowed position generally flush with the seat back and a deployed position generally perpendicular to the seat back, the tray including a first shell having a forward facing surface when in the stowed position and a second shell for mating with the first shell and having a rearward facing surface towards the aft-seated person when in the stowed position. A major recess is defined in the rearward facing surface of the second shell. An inwardly facing elongate flanged is carried by the rearward facing surface of the second shell and extending towards the major recess. A flexible screen is provided for being positioned in the recess by an interference fit between the inwardly facing flange and an engaging surface of the major recess. An insert is positioned between the first shell and the second shell at about the inwardly facing flange for increasing the strength of the inwardly facing flange.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
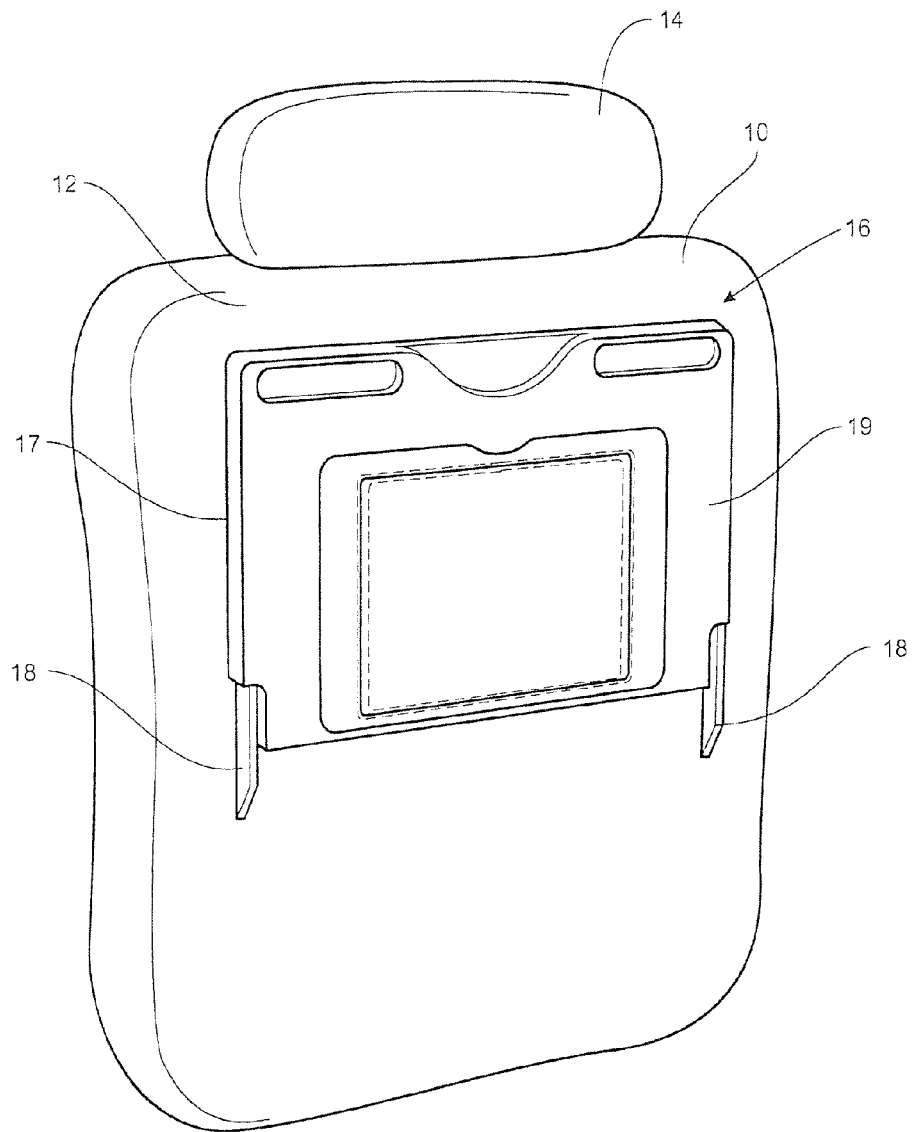
FIG. 1 is a perspective view of a seat back incorporating a meal tray constructed according to one embodiment of the present invention.
Figure 2:
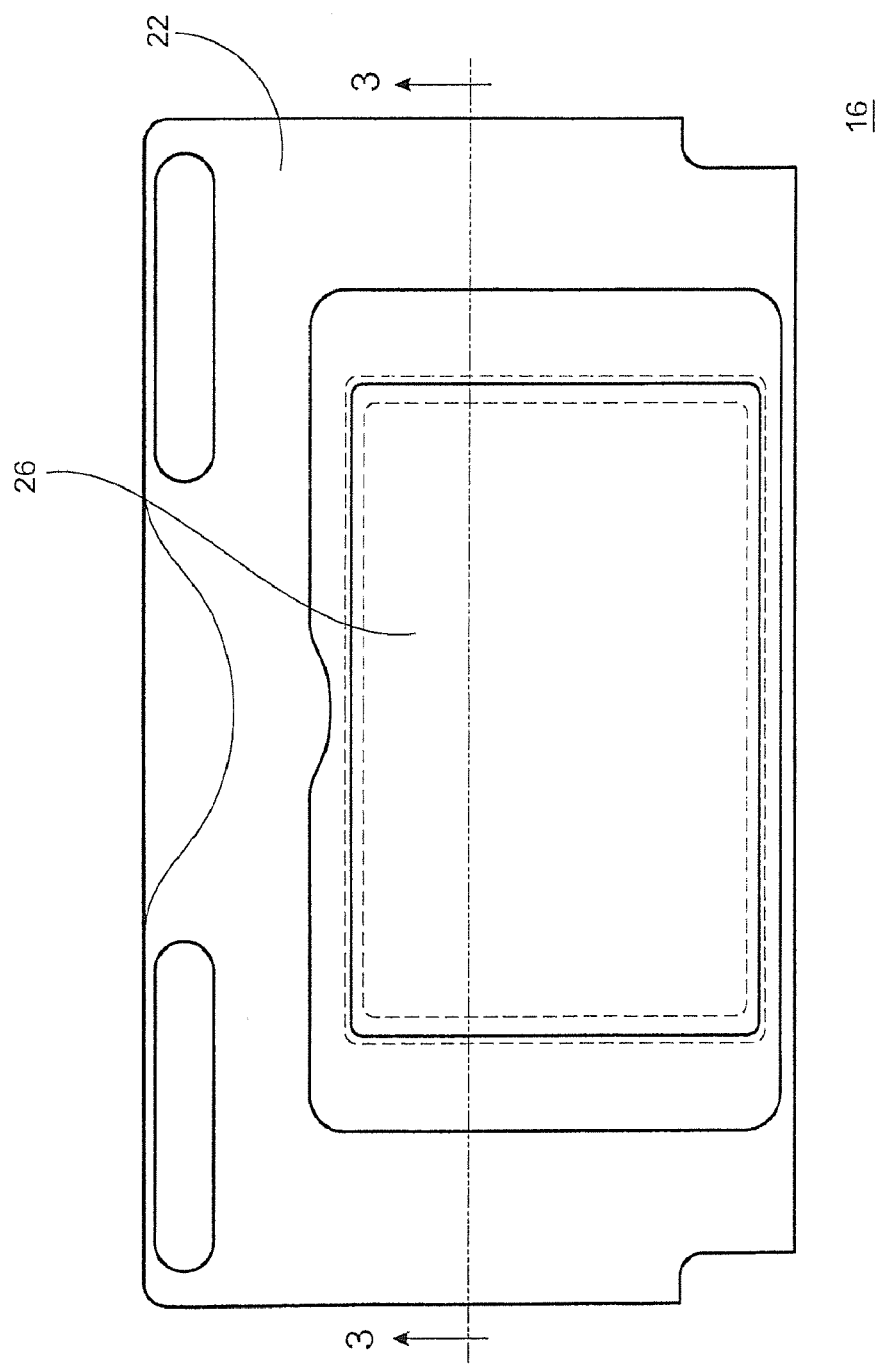
FIG. 2 is a top view of the meal tray of FIG. 1.
Figure 3:
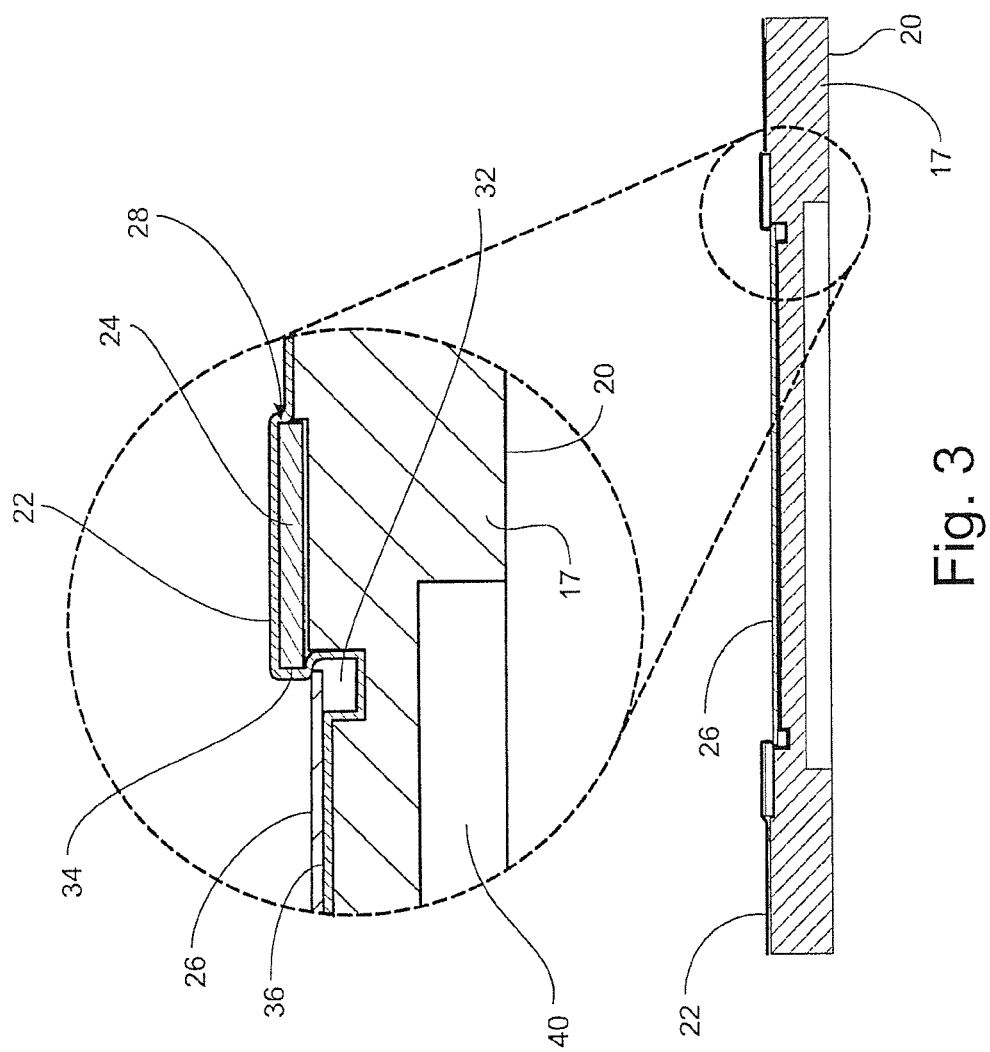
FIG. 3 is a side cross-sectional view of the meal tray.
Figure 4:
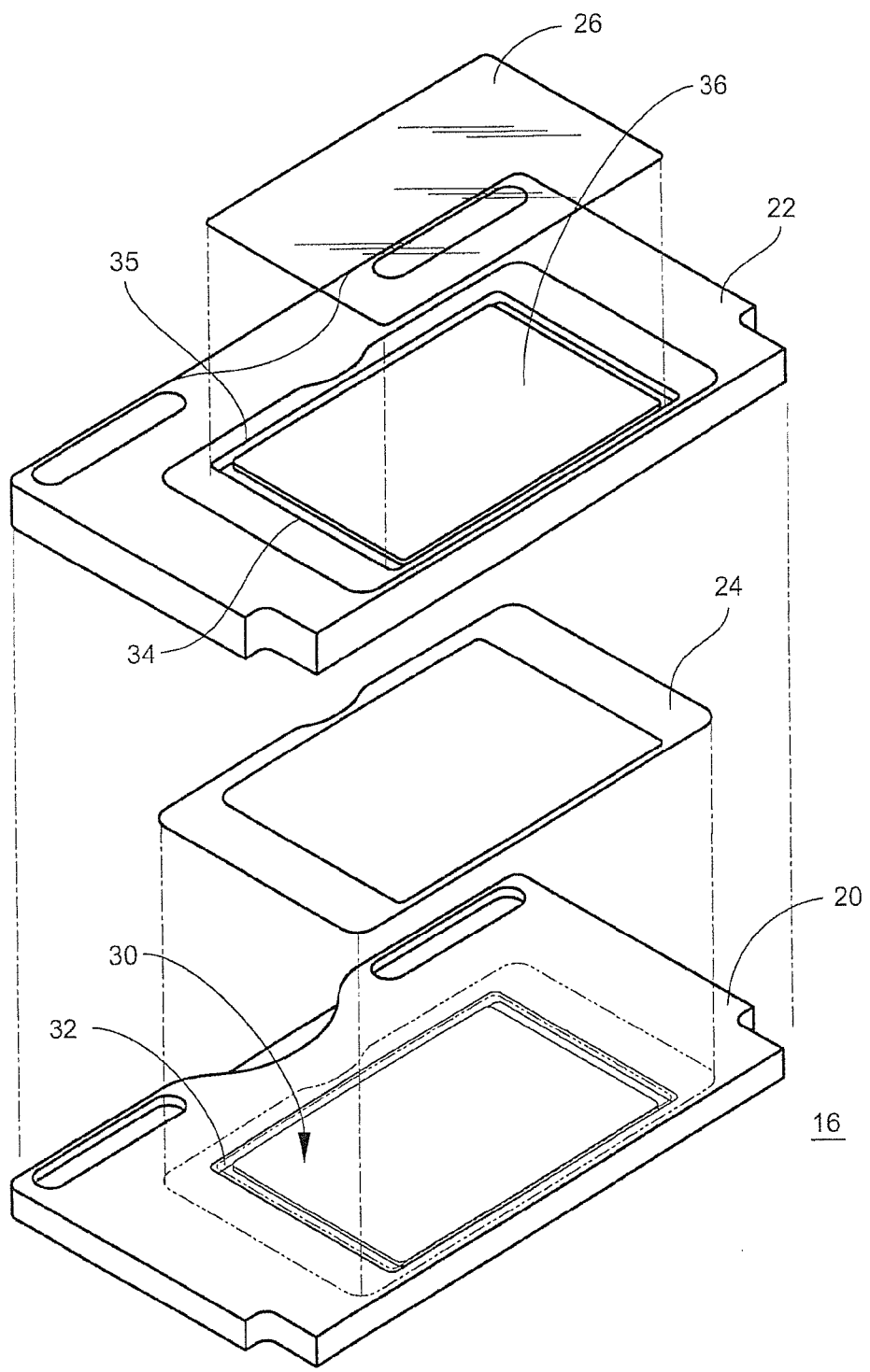
FIG. 4 is an exploded perspective view of the meal tray of FIG. 2.
Figure 5:
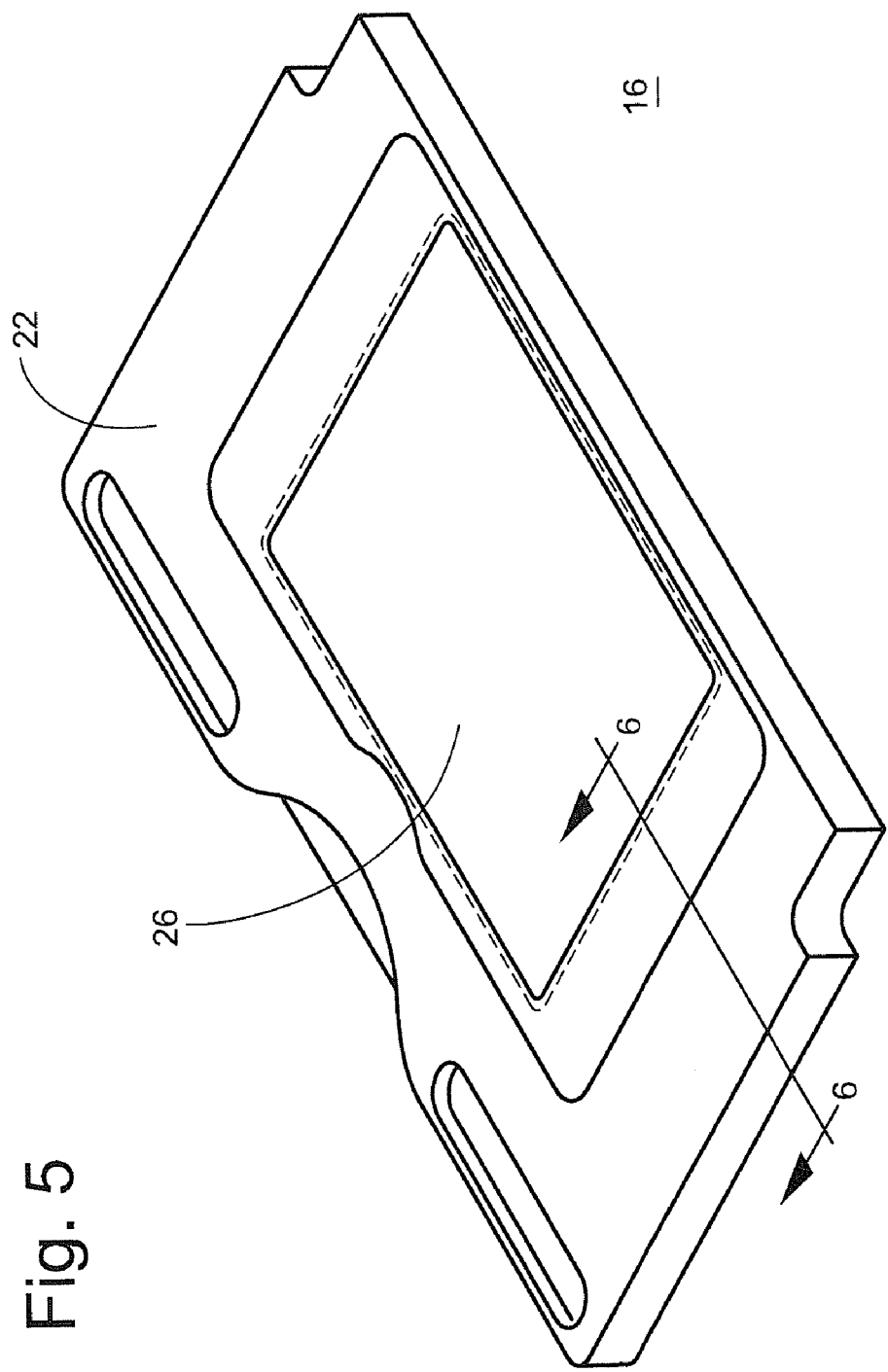
FIG. 5 is a perspective view of the meal tray.
Figure 6:
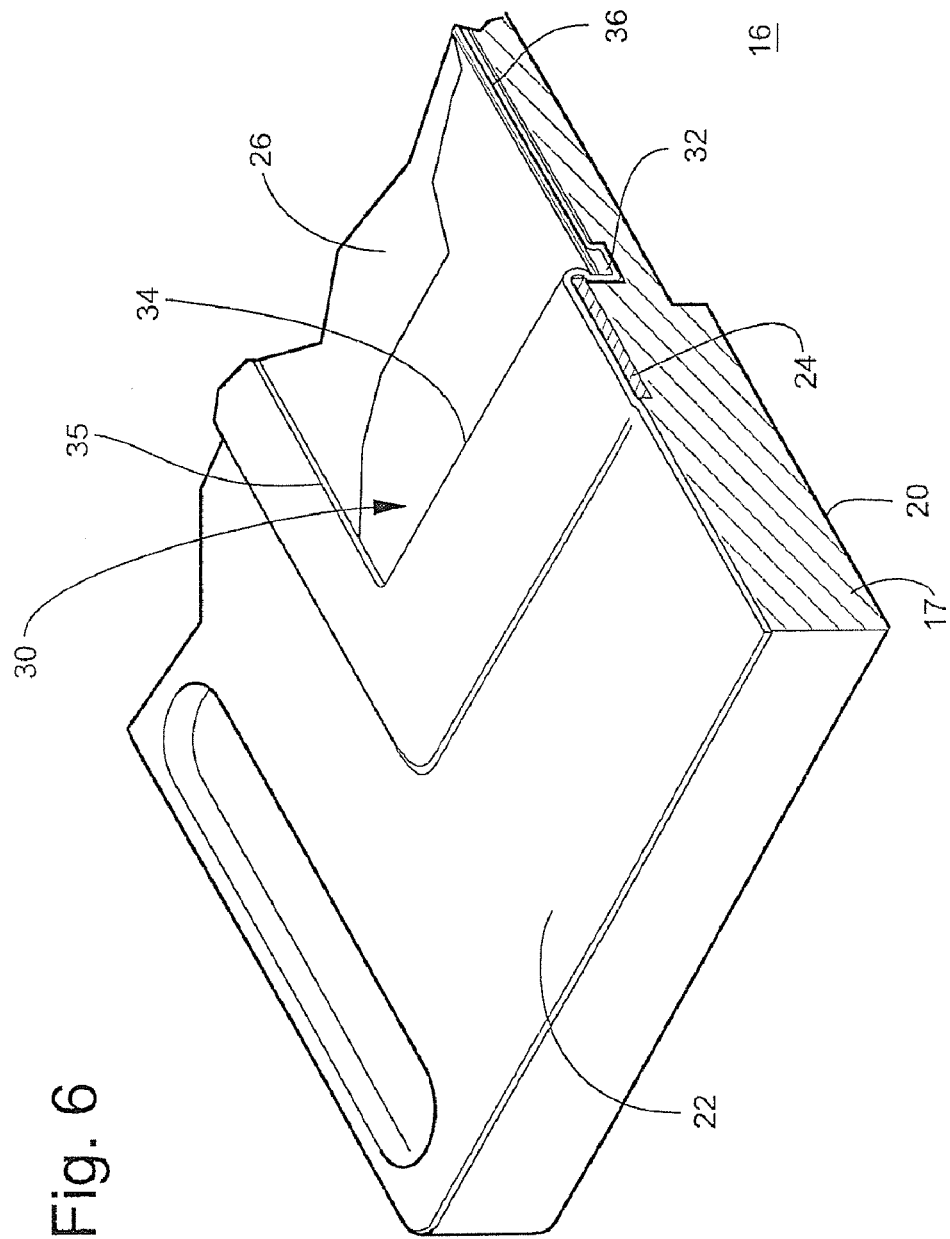
FIG. 6 is a perspective cross-sectional view of the meal tray.

Referring to the drawings wherein identical reference numerals denote the same elements throughout the various views, an aircraft passenger seat back is illustrated in FIG. 1 and shown generally at reference numeral 10. It will be understood that the seat back 10 is part of a seat including a seat bottom and other conventional components not illustrated here. The present invention is equally applicable for use with other kinds of passenger seating, for example seating used in trains, buses or other vehicles. The seat back 10 includes a rear surface 12 and a headrest 14 positioned on an upper end thereof.

A meal tray 16 is carried on pivoting arms 18 or another suitable support structure, so that it can move in a conventional manner between a stowed position against the rear surface 12 of the seat back 10, and a deployed position in which it forms a generally horizontal surface for eating or other tasks.

The meal tray 16 has a first shell 17 having a forward facing surface 20 and a second shell 19 having an aft or rearward facing surface 22 which are designated in relation to its stowed position. The aft surface 22 of the meal tray 16 defines a major recess 30 that is operable for receiving a screen 26 that may include appropriate advertising. The screen 26 is bounded within major recess 30 formed within aft surface 22 by at least a pair of inwardly extending, opposed flanges 34. Flanges 34 are formed by the contours of aft surface 22 and a retaining insert 24 that fits within an insert groove 28 formed in the meal tray 16. Retaining insert 24 is formed such that the flanges 34 extend into the major recess 30, thus securing the screen 26 in place. Screen 26 securely rests between an interference fit created by a bottom surface of flanges 34 and a recess surface 36 defined within recess 30. A minor recess 32 is provided about the periphery of major recess 30 to allow additional clearance of the corners of screen 26. A meal tray recess 40 may be provided on a back surface of the meal tray 16 for providing a resting area for passenger meal items, magazines, or the like. A second pair of flanges 35 may be provided on the surfaces connecting the first pair of flanges 34. The second pair of flanges 35 may act to further secure screen 26 in place. This is best represented in FIGS. 9 and 10.

Figure 7:
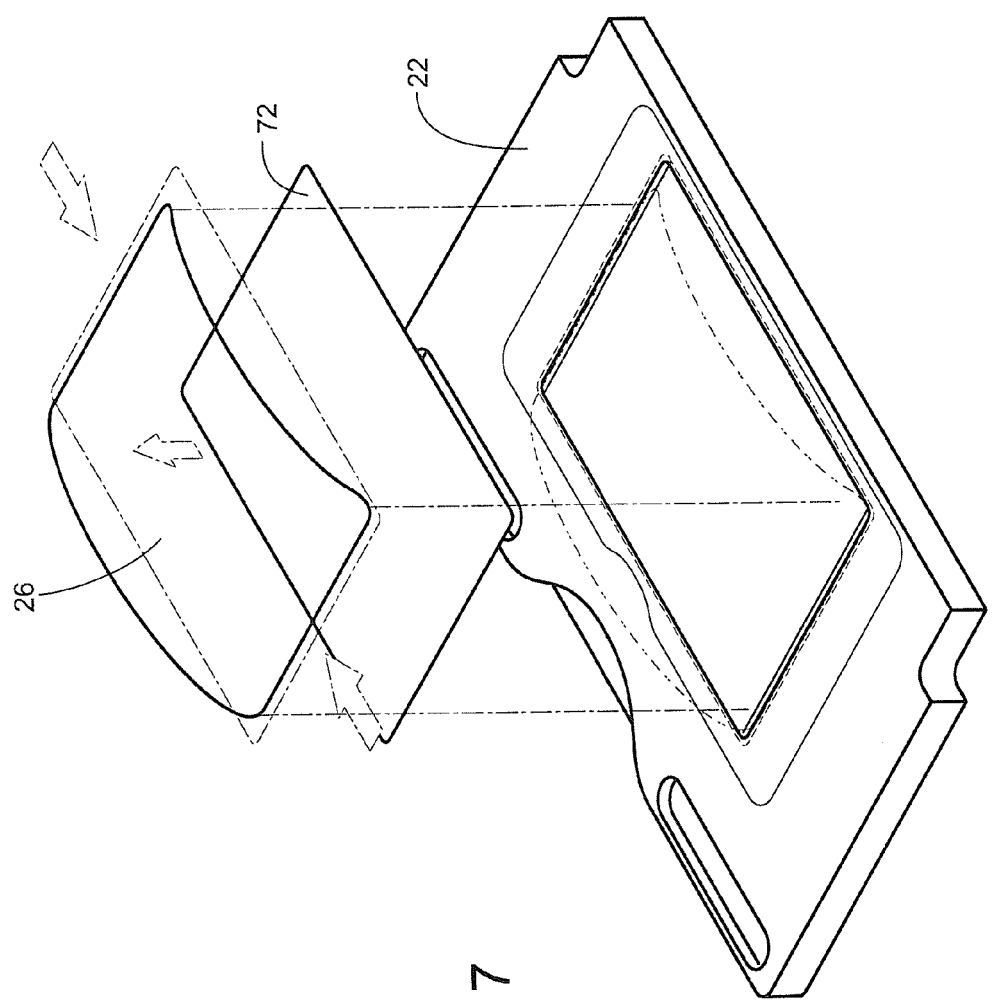
FIG. 7 is a perspective assembly view of the meal tray.
Figure 8:
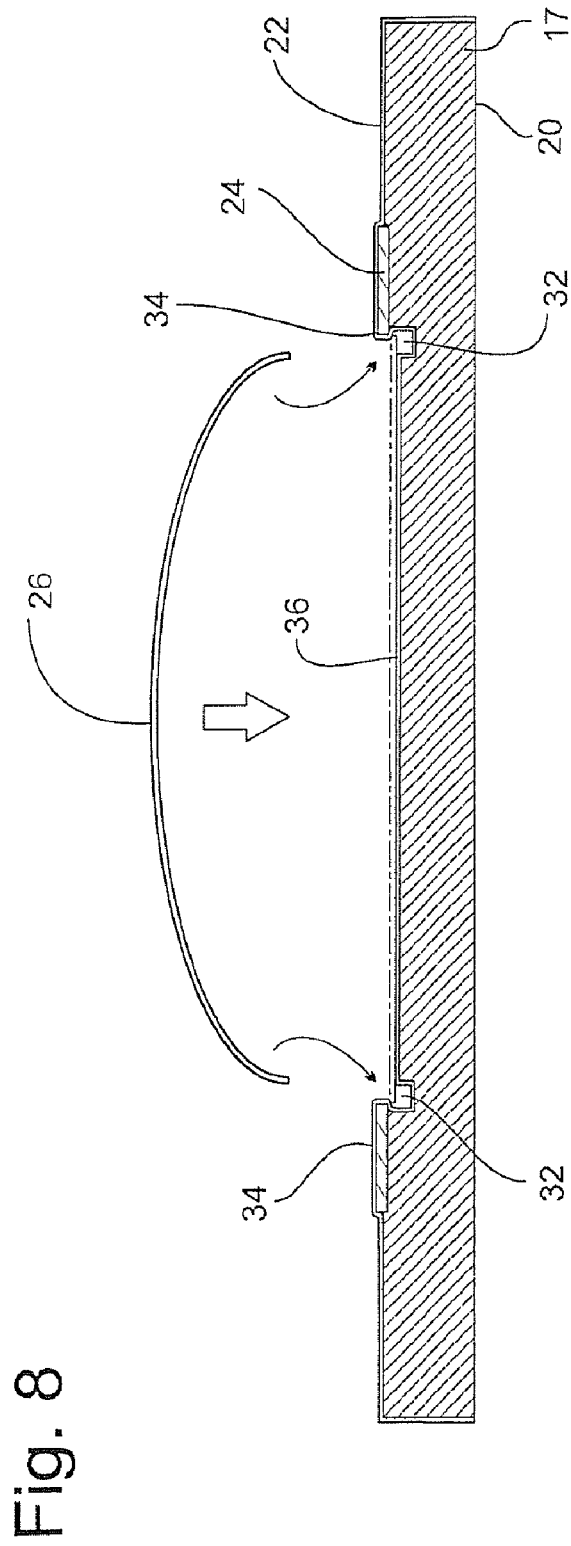
FIG. 8 is a side cross-sectional assembly view of the meal tray.
Figure 9:
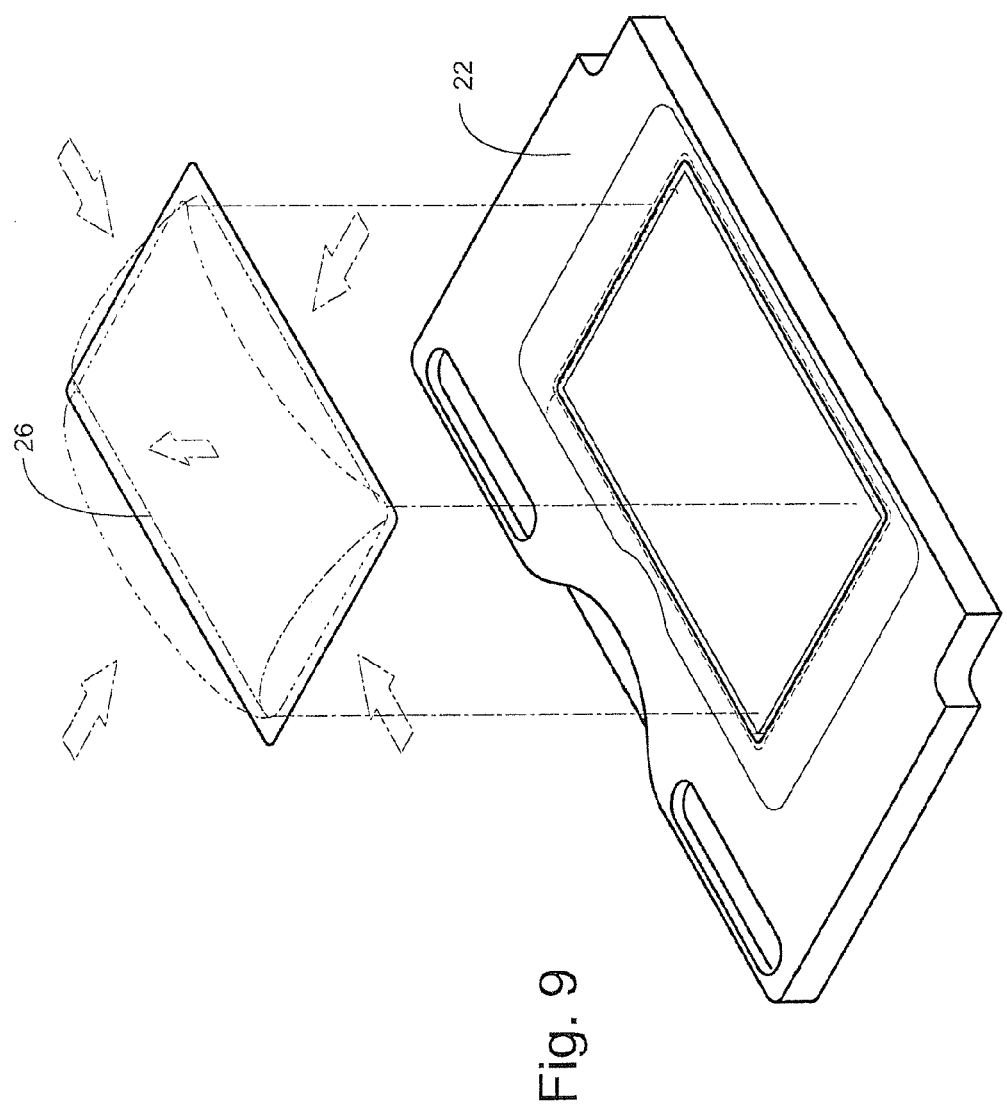
FIG. 9 is another perspective view of the meal tray.
Figure 10:
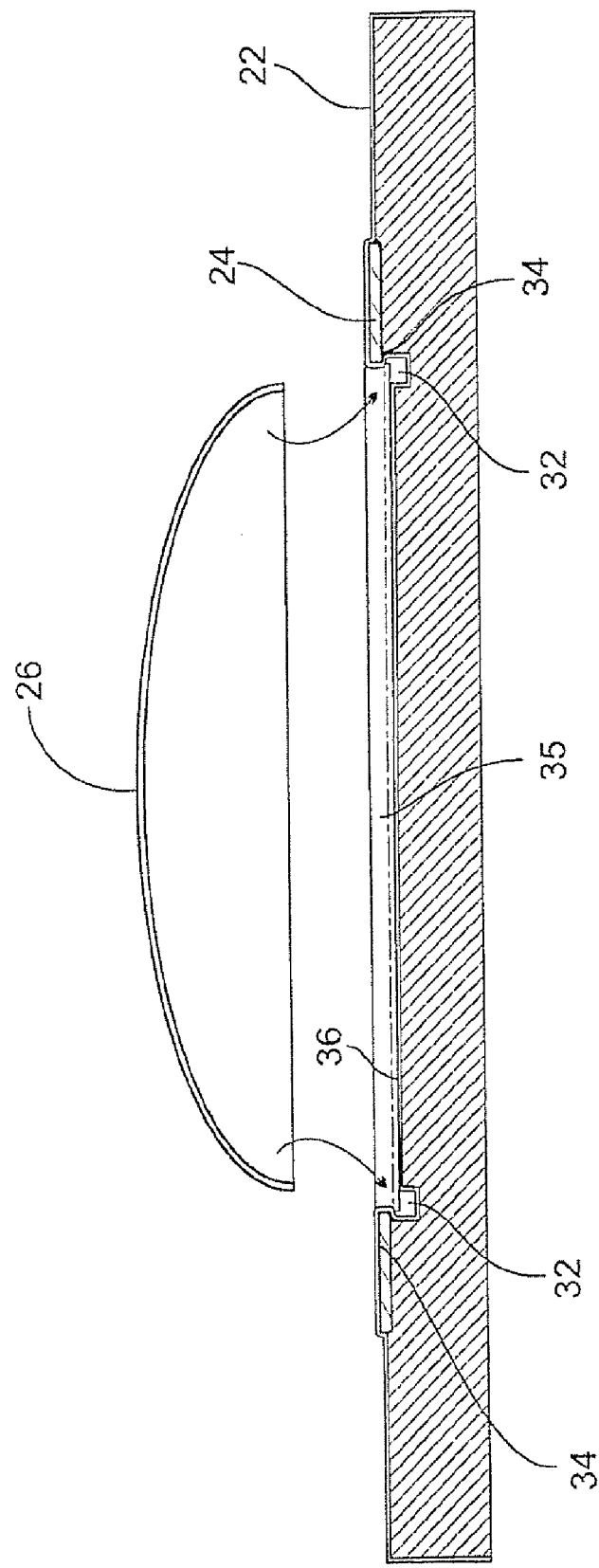
FIG. 10 is another side cross-sectional assembly view of the meal tray.

Operation and usability of the meal tray 16 is best seen with reference to FIGS. 7 through 10. For a screen 26 having just a first pair of flanges 34 as shown in FIGS. 7 and 8, the screen 26 is bent along its longitudinal axis and then positioned in proximity to the aft surface 22. The screen 26 is then positioned such that the corners of screen 26 fit beneath flange 34 and recess surface 36. In some instances, screen 26 may temporarily fit within minor recess 32, while in other instances, the extra clearance space provided by minor recess 32 may not be necessary. The screen 26 is then released so that it straightens about its longitudinal axis as shown by the dashed line portion of screen 26 shown in FIG. 8. Also as shown in FIG. 7, a graphical display sheet 72 may be provided between screen 26 and recess surface 36. In this manner, graphical display sheet 72 would have graphics printed thereon, and screen 26 would be clear such that the display sheet 72 would be visible through screen 26. Once the screen 26 is released and straightens, the screen 26 is held in place by the interference contact caused by flanges 34 and major recess surface 36. For a screen 26 having the first pair of flanges 34 and a second pair of flanges 35, the screen 26 is bent along both its lateral and longitudinal axis and then positioned in proximity to the aft surface 22 as shown in FIGS. 9 an 10.

An advertising display for a seat back meal tray is described above. Various details of the invention may be changed without departing from the scope of the invention. Furthermore, the foregoing description of the preferred embodiment of the invention and best mode for practicing the invention are provided for the purpose of illustration only and not for the purpose of limitation, the invention being defined by the claims.

We claim:

1. A meal tray assembly for being carried by an aft-facing side of a seat back for use by a person seated aft of the seat back, and comprising:
   (a) a tray mountable to the seat back and movable between a stowed position generally flush with the seat back and a deployed position generally perpendicular to the seat back, the tray including a first shell having a forward facing surface when in the stowed position and a second shell for mating with the first shell and having a rearward facing surface towards the aft direction when in the stowed position;
   (b) a major recess defined in the rearward facing surface of the second shell;
   (c) an inwardly facing elongate flange carried by the rearward facing surface of the second shell and extending towards the major recess, the inwardly facing flange comprising a first pair of spaced-apart, opposing flanges carried on laterally extending sides of the rearward facing surface of the second shell and a second pair of spaced-apart, opposing flanges carried on longitudinally extending sides of the rearward facing surface of the second shell; and
   (d) a flexible screen for being positioned in the recess by an interference fit between the inwardly facing flange and an engaging surface of the major recess.

2. The meal tray assembly according to claim 1, wherein the major recess further defines a minor recess about a periphery of the major recess for providing clearance to corners of the screen.

3. A meal tray assembly according to claim 1, wherein the screen is generally flush with the engaging surface when positioned in the major recess.

4. A meal tray assembly according to claim 1, further including an insert positioned between the first shell and the second shell at about the inwardly facing flange for increasing the strength of the inwardly facing flange.

5. A meal tray assembly according to claim 1, wherein the screen has graphics provided thereon.

6. A meal tray assembly according to claim 1, wherein the thickness of the screen is equal to about the distance between a fore facing side of the inwardly facing flange when the tray is in the stowed position and the engaging surface of the recess.

7. A meal tray assembly according to claim 1, wherein the first shell defines a meal tray recess on a fore facing side.

8. A meal tray assembly according to claim 1, wherein the width of the screen is greater than the distance between respective inwardly facing surfaces of the first pair of spaced-apart opposing flanges.

9. A meal tray assembly according to claim 1, wherein the first shell defines a recess that corresponds in shape with the major recess of the second shell to provide mutual engagement of the first and second shells.

10. A meal tray assembly according to claim 1, wherein the height of the screen is greater than the distance between respective inwardly facing surfaces of the second pair of spaced-apart, opposing flanges.

11. A meal tray assembly for being carried by an aft-facing side of a seat back for use by a person seated aft of the seat back, and comprising:
   (a) a tray mountable to the seat back and movable between a stowed position generally flush with the seat back and a deployed position generally perpendicular to the seat back, the tray including a first shell having a forward facing surface when in the stowed position and a second shell for mating with the first shell and having a rearward facing surface towards the aft-direction when in the stowed position;

(b) a major recess defined in the rearward facing surface of the second shell;

(c) an inwardly facing elongate flanged carried by the rearward facing surface of the second shell and extending towards the major recess, the inwardly facing flange including a first pair of spaced-apart, opposing flanges carried on laterally extending sides of the rearward facing surface of the second shell and a second pair of spaced-apart, opposing flanges carried on longitudinally extending sides of the rearward facing surface of the second shell;

(d) a flexible screen for being positioned in the recess by an interference fit between the inwardly facing flange and an engaging surface of the major recess; and (e) an insert positioned between the first shell and the second shell at about the inwardly facing flange for increasing the strength of the inwardly facing flange.

12. A meal tray assembly according to claim 11, wherein the height of the screen is greater than the distance between respective inwardly facing surfaces of the second pair of spaced-apart, opposing flanges.

13. A meal tray assembly according to claim 11, wherein the first shell defines a recess that corresponds in shape with the major recess of the second shell to provide mutual engagement of the first and second shells.

14. The meal tray assembly according to claim 11, wherein the major recess further defines a minor recess about a periphery of the major recess for providing clearance to corners of the screen.

15. A meal tray assembly according to claim 11, wherein a first surface of the screen is generally flush with the engaging surface and a second opposed surface of the screen is generally flush with a fore facing side of the inwardly facing flange when the tray is in the stowed position and the screen is positioned in the major recess.

16. A meal tray assembly according to claim 11, wherein the thickness of the screen is equal to about the distance between a fore facing side of the inwardly facing flange when the tray is in the stowed position and the engaging surface of the recess.

17. A meal tray assembly according to claim 11, wherein the first shell defines a meal tray recess on a fore facing side.

18. A meal tray assembly according to claim 11, wherein the width of the screen is greater than the distance between respective inwardly facing surfaces of the first pair of spaced-apart opposing flanges.

* * * * *